Patented Nov. 8, 1932

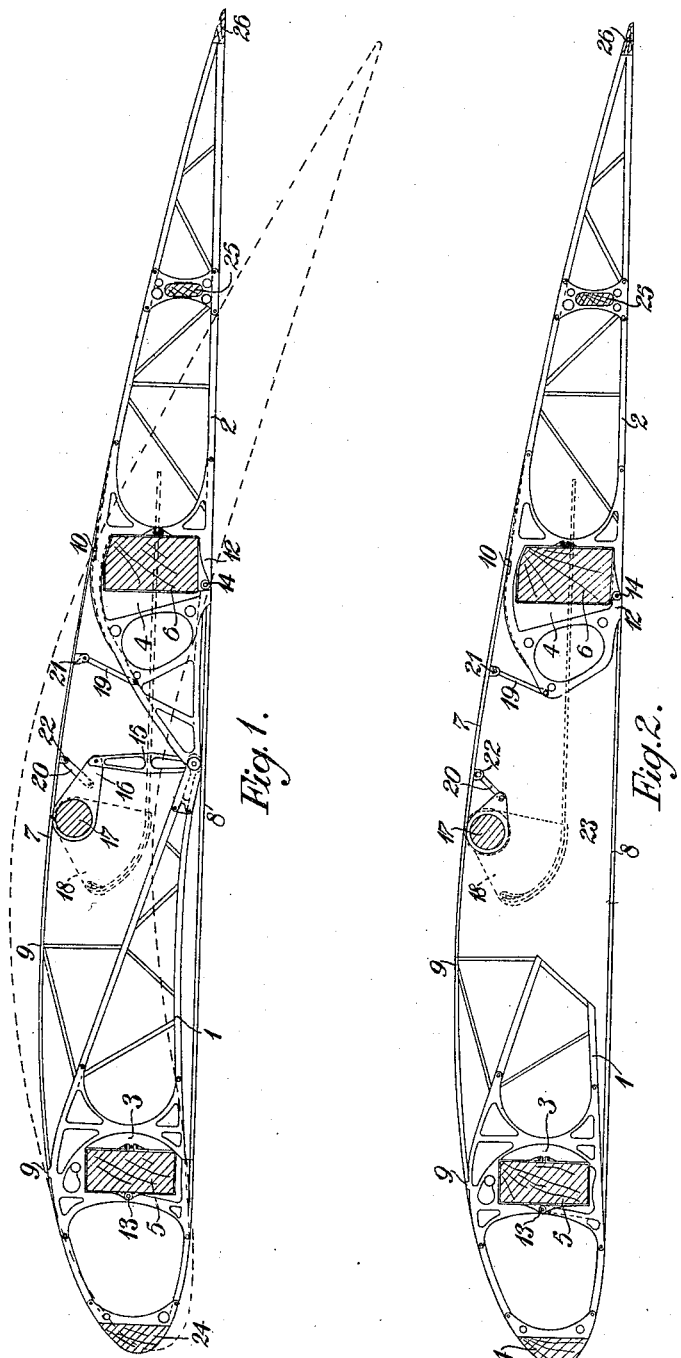

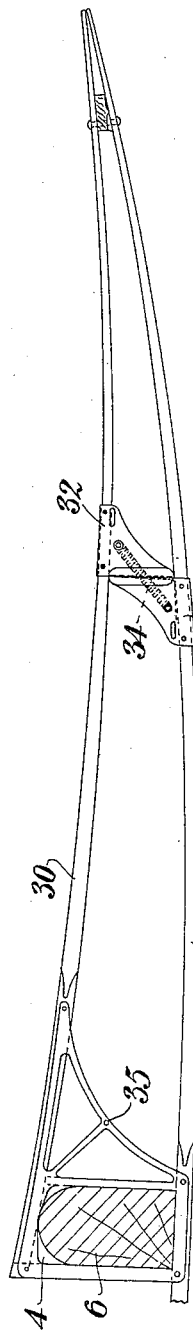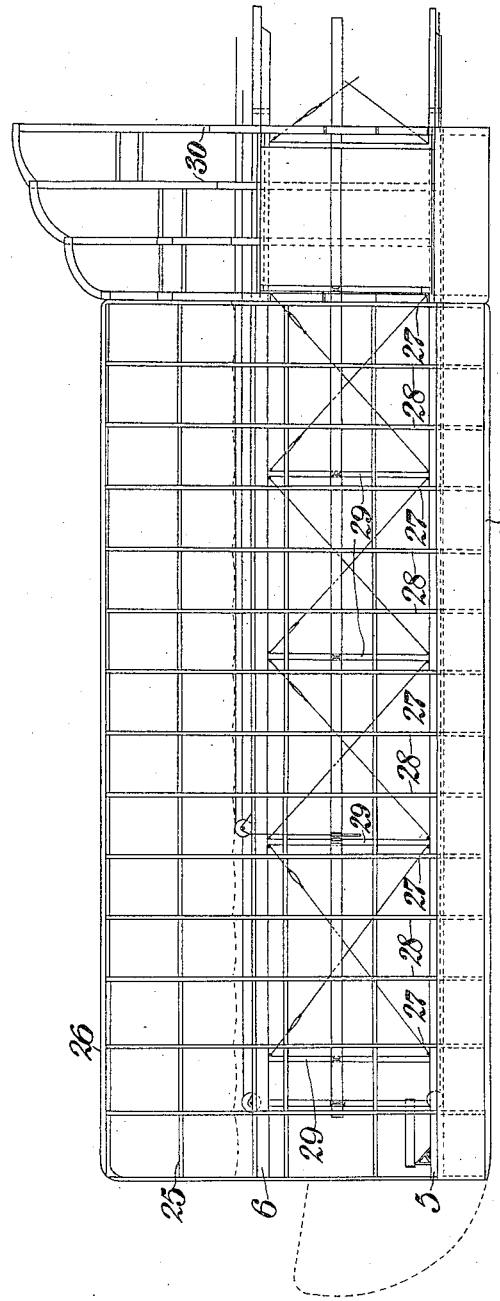

1,886,362

UNITED STATES PATENT OFFICE

UGO ANTONI, OF LONDON, ENGLAND

CONSTRUCTION OF FLEXIBLE AEROPLANE WINGS HAVING A VARIABLE PROFILE

Application filed August 24, 1931, Serial No. 559,052, and in Great Britain August 27, 1930.

Flexible aeroplane wings having a variable profile are known in which means are provided under the control of the pilot for the purpose of varying the profile or curvature of the wing with the object of obtaining a quick change of speed and/or a variation in the carrying capacity of the wing and in which parts which flex outside the control of the pilot are inserted in the wings for maintaining the whole aeroplane automatically in balance and giving a propelling force when the engine stops, due to the upward resistance of the air on the flexible parts.

The present invention relates to flexible aeroplane wings of this kind, in which the wing deformation in the part controlled by the pilot is obtained by means of front levers pivoted on a spar towards the leading edge of the wing, and rear levers pivoted on a spar towards the tail edge, the free ends of these levers being brought together and connected by links and connecting rods to an operating shaft extending along the length of the wing and mounted on supporting members secured to the spars. The wing itself comprises upper and lower profile forming strips permitting this deformation to take place.

In my prior British specification No. 269,848, such a construction of aeroplane wing is described in which the flexible strips forming the upper and lower profile of the wing surface in its middle part are secured in recesses in one lever and slide freely in recesses in the other lever, and at intermediate points these flexible strips are arranged to slide and be guided in sleeves carried at the ends of vertical posts having a length relative to the wing profile.

The pivot of the levers lie on the geometric axis of the lower flexible strips, and the wing is deformed by rotating the operating shaft through a control lever, the strips sliding at their free ends in the recesses provided for them in the levers and also sliding in their intermediate guides, as they take up their new curvature.

The object of the present invention is to provide an improved construction of an aeroplane wing of the kind set forth.

According to a first feature of the invention, one or both of the centres of the lever pivots is mounted eccentrically with regard to the geometric axis of the lower flexible profile strip.

According to another feature of the invention, the lower profile-forming strip is rigidly fixed at both ends in recesses provided for it in the front and rear levers.

According to a further feature of the invention, the upper flexible profile-forming strip is fixed at one end and slides at the other in a recess provided for it, the strip being connected at intermediate points to the corresponding lever and/or to the operating shaft, by means of connecting rods.

According to a still further feature of the invention, the mechanism connection between the front and rear levers of certain of the wing elements and the operating shaft is omitted, and these levers are instead connected rigidly with the corresponding levers of the deformable wing elements which are mechanically connected to the shaft.

As the lever pivots and profile strips remain the same in all the wing elements, this rigid connection compels all the deformable members of the parts controlled by the pilot to assume the same profile when the wing is deformed, and it also enables the shape of the above-mentioned levers to be modified in the middle part of the wing, generally by removing the part close to the operating shaft.

Appropriate holes in the levers connected to the shaft and the cut-away portions in the other levers permit the static rigidity of the wings to be secured by means of distributed struts and by crossing guy wires connected to the spars. These guy wires, for the particular construction above described, do not interfere with the movement of the whole system.

According to a further feature of the invention the part of the wing comprising the portion which flexes outside the control of the pilot is made completely rigid and undeformable in its remaining portion.

Another feature of the invention relates to the portion of wing which flexes outside the control of the pilot. Its flexible part is situated at the rear of the trailing spar, being usually composed of flexible strips which can flex upwards but not downwards. The length of these strips increases as a wing element approaches the longitudinal axis of the aeroplane. The upper and lower strips of the wing elements are bound together so that they cannot approach each other and are connected by elastic means tending to prevent them from moving away from each other. The automatic maintenance in balance of the aeroplane surface and the propelling force are related with the stresses to which these strips are subjected when they yield.

According to the invention the upper strip and the lower strip of each such wing element are made to work fairly equally by varying the front point of insertion of the upper strip, so as to proportion its length suitably with respect to the lower strip, and/or by altering by suitable means the flexibility of one strip with respect to the other.

One embodiment of an aeroplane wing constructed according to the invention is illustrated by way of example in the accompanying drawings, in which:—

Figure 1 is a sectional view of a wing element, in which the front and rear levers are connected to the operating shaft.

Figure 2 is a sectional view of a wing element in which the front and rear levers are shortened and the mechanical connection to the operating shaft is omitted.

Figure 3 is a sectional view of the portion of a wing element which flexes outside the control of the pilot.

Figure 4 is a plan view of a wing showing the framework of members.

The wing element shown in section in Figure 1 comprises a frame or lever 1 at the front of the wing and a second framework or lever 2 at the rear of the wing, these levers having holes 3 and 4 formed in them for the passage of the corresponding spars 5 and 6.

The profile of the wing is completed by upper and lower strips 7 and 8. The upper strips 7 are rigidly secured at 9 to the front lever and slide at 10 in a convenient recess in the rear lever, while the lower strips 8 are rigidly secured at each end to the front and rear levers at 11 and 12.

The levers 1 and 2 are pivoted on the spars 5 and 6. In order to permit the deformation of the wing, one or both of these pivots is situated eccentrically with respect to the geometric axis of the lower strip 8. The object of this eccentricity is to permit the points 11 and 12 to approach each other when the wing curvature has to be increased and so to permit the required deformation of the wing. In the example shown, the pivot 13 of the front lever is arranged to lie midway along one of the vertical sides of the spar 5 while the pivot 14 of the rear lever lies on the underside of the spar 6 but is situated slightly above the geometric axis of the strip 8.

The adjacent free ends of the front and rear levers are connected by a connecting rod 15 with an arm 16 mounted on an operating shaft 17 running along the length of the wing and operated by a control quadrant 18 or other suitable means.

The rotation of the shaft 17 produces a rotation of the levers 1 and 2 and a consequent change in the curvature of the wing.

The upper strip 7 in addition to being rigidly secured at one end to the front lever is secured at intermediate points by a link 19 to the rear lever, and by a link 20 to the arm on the operating shaft. The links 19 and 20 are pivoted at one end to the arm and lever and at the other end to brackets 21 and 22 rigidly mounted on the upper strip.

By suitably proportioning the lengths of these links, the curvatures which the upper strip adopts are controlled while the presence of the links serves to strengthen the structure and make it more rigid.

In order to permit the structure of the wing to be braced by means of crossing guy wires, the form of the front and rear levers is modified in certain of the wing elements to permit the passage of these wires.

One such modified wing element is shown in Figure 2. In this figure it will be seen that the adjacent inner ends of the levers 1 and 2 are shortened and that the connection between the arm 16 and these levers is omitted. In this way a free space is left at the middle portion of the wing for the passage of guy wires shown at 23.

In the case of these modified wing elements, the levers can no longer be operated directly by the shaft 17 since the connection with this shaft no longer exists. They are therefore rigidly connected with the other wing elements by means of the members 24, 25 and 26 running along the length of the wing.

In this way these wing elements follow the movements of the wing elements operated directly by the shaft 17, and as the links 19 and 20 remain in all cases the deformation of the upper strip continues to be controlled positively.

In the plan view shown in Figure 4 the wing elements connected to the shaft are indicated at 27 and those in which the connection to the shaft has been removed to allow the passage of the guy wires are shown at 28. The guy wires are secured at their ends to the spars 5 and 6 and the wings are further stiffened by stays or struts 29 suitably distributed over the length of the wing.

In this figure the part of the wing comprising the portion which flexes outside the control of the pilot lies between the points A—A and B—B. The front and middle part of this section of the wing is rigid while the rear part is flexible. The flexion of this part maintains the aeroplane automatically in balance and provies the propelling force when the engine stops, and this occurs when the flying conditions of the aircraft are such that the air is made to offer a resistance in an appropriate direction to the movement of the said part.

A side view of an element of the said flexible portion is shown in Figure 3.

This wing element is composed of the upper flexible strips 30 and lower flexible strips 31 which are capable of flexing upwards but not downwards. The length of the strips increases as they approach the longitudinal axis of the aeroplane.

A resilient connection is provided between the strips 30 and 31 which prevents the strips approaching each other while allowing them to open out to a certain extent. This connection is formed by the bracket 32 on the strip 30, the bracket 33 on the strip 31 and the tension spring 34 connecting the brackets together.

The butt end of this flexible wing element is supported by a fixed frame 35 rigidly secured to the spar 6. The upper portion of this frame is extended along the strip 30 to which it is secured, so as to shorten the flexible length of this strip, in a calculated proportion with respect to the length of the lower strip 30. By suitably proportioning the flexible lengths of these strips in this way the upper strip is made to work fairly equally with the lower strip 30. In addition to or instead of varying the length of the upper strip, its flexibility may also be varied by suitable means, for example by varying its section or its shape or the material it is made of with respect to the section, shape or material of the other strip.

Any modifications of details may naturally be made without on that account going outside the scope of the invention.

What I claim is:

1. Variable camber wing for aeroplanes comprising a pair of spacedly arranged spars and members rigidly connecting these spars together, wing ribs on these spars each comprising a lever having an aperture for the front spar pivotally connected to said spar, a lever having an aperture for the rear spar pivotally connected to said spar, said levers being provided on the upper sides with recesses adapted to receive flexible strips forming the top profile of the wing and on their lower side with recesses adapted to receive flexible strips forming the lower profile of the wing, one of said levers being pivotally connected to the corresponding spar at a point remote from (i. e. above) the point of attachment of the lower profile strip to the lever, whereby the said point of attachment can move through an arc and permit the curvature of the lower profile strip without any lengthening of this profile strip between its points of attachment to the front and rear levers, control means being associated with said levers whereby the profile of the wings is controlled by the pilot.

2. A variable camber wing for aeroplanes according to claim 1, wherein both of said levers are pivotally connected to the corresponding spars at points remote from (i. e. above) the points of attachment of the lower profile strip to the levers.

3. A variable camber wing for aeroplanes comprising a pair of spacedly arranged spars and members rigidly connecting these spars together, wing ribs on these spars each comprising a lever having an aperture for the front spar pivotally connected to said spar, a lever having an aperture for the rear spar pivotally connected to said spar, said levers being provided on their upper sides with recesses adapted to receive flexible strips forming the top profile of the wing, and on their lower side with recesses wherein are fixedly secured the ends of flexible strips forming the lower profile of the wing, one of said levers being pivotally connected to the corresponding spar at a point remote from (i. e. above) the point of attachment of the lower profile strip to the lever, whereby the said point of attachment can move through an arc and permit the curvature of the lower profile strip without any lengthening of this profile strip between its points of attachment to the front and rear levers, control means being associated with said levers whereby the profile of the wings is controlled by the pilot.

4. A variable camber wing for aeroplanes according to claim 1, wherein the upper profile forming strip of the wing rib is rigidly fixed at one end to one lever and slidable at the other end in a recess provided for it in the other lever, the strip being connected at intermediate points to the corresponding lever by means of connecting rods.

5. A variable camber wing for aeroplanes according to claim 1, further comprising an operating shaft mounted in the members connecting the spars rigidly together, and running along the length of the wing, the upper profile forming strip of the wing ribs being rigidly fixed at one end to one lever and slidable at the other end in a recess in the other lever, and connecting rods connecting the strip at intermediate points to the lever wherein said strip slides.

6. A variable camber wing for aeroplanes according to claim 1, further comprising an operating shaft mounted in the members connecting the spars rigidly together and running along the length of the wing, means connecting said operating shaft with the front and rear levers of certain of the wing ribs and means whereby the front and rear levers of the other wing ribs are rigidly connected with the corresponding levers of those wing ribs which are connected to said shaft.

7. A variable camber wing for aeroplanes according to claim 1, further comprising an operating shaft mounted in the members connecting the spars rigidly together and running along the length of the wing, means connecting said operating shaft with the front and rear levers of certain of the wing ribs and means whereby the front and rear levers of the other wing ribs are rigidly connected with the corresponding levers of those wing ribs which are connected to said shaft, the levers of the wing ribs which are not connected to the operating shaft being suitably shortened to permit the passage of crossing guy wires secured to the spars.

8. Variable camber wing for aeroplanes according to claim 1 wherein the wing comprises a flexible portion which flexes outside the control of the pilot.

9. Variable camber wing for aeroplanes according to claim 1 wherein the wing comprises a flexible portion which flexes outside the control of the pilot, the said portion being flexible at its trailing edge and rigid and deformable at its leading portion.

10. Variable camber wing for aeroplanes according to claim 1, the wing further comprising a flexible trailing portion which flexes upwards outside the control of the pilot, this portion comprising upper and lower flexible profile strips and being supported on a fixed bracket rigidly secured to the trailing spar and extending along the upper profile strip of said freely flexible portion whereby the effective flexible length of said upper profile strip is shortened.

11. Variable camber wing for aeroplanes according to claim 1, the wing further comprising a flexible trailing portion which flexes upwards outside the control of the pilot, this portion comprising upper and lower flexible profile strips suitably proportioned so as to work under fairly equal conditions of stress.

In testimony whereof I have signed my name to this specification.

UGO ANTONI.